United States Patent
Kondo et al.

(10) Patent No.: US 6,395,249 B1
(45) Date of Patent: May 28, 2002

(54) PRODUCTION PROCESS AND APPARATUS FOR HIGH PURITY SILICON

(75) Inventors: Jiro Kondo; Haruo Shimada; Shinji Tokumaru; Ryuji Watanabe; Atsushi Nogami, all of Futtsu; Akihito Kiyose, Kimitsu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/582,383

(22) PCT Filed: Dec. 25, 1998

(86) PCT No.: PCT/JP98/05968

§ 371 (c)(1),
(2), (4) Date: Jun. 23, 2000

(87) PCT Pub. No.: WO99/33749

PCT Pub. Date: Jul. 8, 1999

(30) Foreign Application Priority Data

Dec. 25, 1997 (JP) .............................. 9-357656
Mar. 24, 1998 (JP) .......................... 10-076121

(51) Int. Cl.$^7$ .............................................. C01B 33/037
(52) U.S. Cl. ........................ 423/349; 423/348; 423/350
(58) Field of Search ................................ 423/348, 349, 423/350

(56) References Cited

U.S. PATENT DOCUMENTS

| | | | |
|---|---|---|---|
| 875,285 A | 12/1907 | Potter | |
| 3,010,797 A | 11/1961 | Aries | 423/350 |
| 3,660,298 A | 5/1972 | McClincy et al. | 252/183.14 |
| 4,702,902 A | * 10/1987 | Dosaj et al. | 423/350 |
| 4,981,668 A | * 1/1991 | Dosaj et al. | 423/350 |
| 5,009,703 A | * 4/1991 | Arvidson et al. | 423/350 |
| 5,096,685 A | * 3/1992 | Funahashi et al. | 423/325 |
| 5,104,633 A | * 4/1992 | Sakaguchi et al. | 423/350 |

FOREIGN PATENT DOCUMENTS

| | | |
|---|---|---|
| JP | 40-22050 | 9/1965 |
| JP | 49-98807 | 9/1974 |
| JP | 59-8613 | 1/1984 |
| JP | 62-27313 | 2/1987 |
| JP | 62-123009 | 6/1987 |
| JP | 63-79717 | 4/1988 |
| JP | 63-103814 | 5/1988 |
| JP | 63-103815 | 5/1988 |
| JP | 5-171412 | 7/1993 |

* cited by examiner

*Primary Examiner*—Ngoc-Yen Nguyen
(74) *Attorney, Agent, or Firm*—Kenyon & Kenyon

(57) ABSTRACT

It is possible to produce high purity Si by heating solid SiO at a temperature of at least 1000° C. and lower than 1730° C., for a disproportionation reaction in which the SiO solid is decomposed to liquid or solid Si and solid $SiO_2$, and the produced Si is separated from the $SiO_2$ and/or SiO. The SiO solid can be obtained by a process whereby a starting mixture of carbon C, silicon Si or ferrosilicon, or a combination thereof, with $SiO_2$ is heated to generate SiO gas-containing gas, and the SiO-containing gas is cooled to produce SiO solid.

18 Claims, 3 Drawing Sheets

PRODUCTION PROCESS AND APPARATUS FOR HIGH PURITY SILICON

TECHNICAL FIELD

The present invention relates to a production process and apparatus for economical and efficient production of high purity silicon, for example, Si with a purity of 99.999% or higher. Si of such purity can be utilized as Si for solar batteries.

BACKGROUND ART

Solidifying purification may be mentioned as a general process for metal purification. In the case of Si, heat-melted Si is cooled to solidification during which time the impurity elements other than Si are concentrated and condensed in the last solidified portion, and this portion is removed to obtain the purified Si. This process is based on the fact that most impurity elements have a small segregation coefficient for Si, but since the segregation coefficient of boron or phosphorus is close to 1 they are therefore difficult to remove by this process; in practice, therefore, it is difficult to achieve a purification of 99.999% or higher from Si with a purity of about 99% that is easily obtained by solidifying purification alone.

A common production process for high purity Si is a process widely employed in industry known as the Siemens process, whereby high purity Si is obtained by utilizing chlorides of Si; however, it is mainly suited for semiconductor related purposes, and while the purity achieved is above 99.999999% which is much better than the 99,999% required for solar battery Si, the production cost is high rendering it unsuitable for solar battery production.

One example of an attempt at easier production of Si at a purity that can be utilized in solar batteries is the process disclosed in Japanese Unexamined Patent Publication SHO No. 63-79717, whereby SiO gas is emitted from silica stone and metallic silicon and the gas is reduced by carbon kept at 1600 to 2400° C. Another process found in U.S. Pat. No. 875,285 also reduces SiO with carbon, but neither of these processes deal with purification and no process is described for obtaining high purity Si. Reduction by carbon generally leaves carbon residue in the resulting Si since carbon is a solid, and it is therefore difficult to obtain high purity Si.

As a method of overcoming this problem, it has been considered that reducing SiO with a gas such as high purity hydrogen could minimize inclusion of impurities from the reducing agent. Below the melting point of SiO at about 1730° C., SiO can only take the form of a solid or a gas with a pressure below the saturation vapor pressure, and in general, reaction with a reducing agent for reduction of solid or vapor SiO to obtain Si does not proceed very readily. The following process has been proposed as a solution.

Japanese Unexamined Patent Publication SHO No. 62-123009 describes a process in which silicon tetrachloride, trichlorosilane, silane and a silicon alcoholate are heat decomposed or flame heat decomposed to produce a fine particle aggregate of silicon monoxide and/or silicon dioxide, and the fine particle aggregate is reduced in a reducing atmosphere at 200° C. or above to produce silicon. The size of the fine particles forming the fine particle aggregate is given as 10–100 nm, but since such fine particles are very highly reactive, they were thought to be susceptible to reduction. High purity silicon tetrachloride, trichlorosilane, silane and silicon alcoholate products are industrially produced and the resulting SiO fine particle aggregates are expected to be of high purity, so that reduction thereof gives high purity Si. However, silicon tetrachloride, trichlorosilane, silane and silicon alcoholate are costly, and therefore the final resulting Si is also costly.

One problem common to reduction processes occurs when the impurities in SiO become concentrated in the Si produced. The Si obtained by reduction of SiO is under 64 wt % of the SiO, and since the impurities in the SiO are not removed by high temperature reducing atmospheres, the impurities become concentrated in the Si which is under 64 wt % of the SiO, so that the resulting Si has a lower purity than the original SiO.

In U.S. Pat. No. 3,010,797 there is described a process in which silicon and silica are reacted to obtain SiO vapor which is reduced by hydrogen, and particularly a process in which it is reduced by hydrogen that has permeated through palladium or the like, or a process in which it is reduced by hydrogen in the copresence of it platinum. This process uses SiO obtained by reaction of silicon and silica, and both the silicon and silica starting materials are inexpensive and readily obtainable so that there is no problem with starting material cost. However, the following problems must be dealt with.

The first problem in U.S. Pat. No. 3,010,797 is that a large amount of hydrogen is necessary for hydrogen reduction of the SiO vapor obtained from the silicon and silica. While 90.5% of the total amount of Si contained in the SiO was obtained according to Example 1 of U.S. Pat. No. 3,010,797, the hydrogen required for this was 6 times the stoichiometric amount. When palladium is used in Example 3 of U.S. Pat. No. 3,010,797, hydrogen is required at 20 times the stoichiometric amount in order to obtain 86.5% of the total Si in the SiO. Since one mole of Si is about 28 g and one mole of hydrogen is about 22.4 L at room temperatures atmosphere, even if 100% of the Si in the SiO were obtained it would require 134–448 L of hydrogen to obtain about 28 g of Si by the reaction in this example. This is also clear from claim 1 of U.S. Pat. No. 3,010,797, where it is stated that an excess of hydrogen over the stoichiometric amount is necessary for reduction. This can be expected since most SiO is highly stable against reduction reaction, whether in gaseous or solid form. Except for specially synthesized SiO fine particle aggregates such as described in Japanese Unexamined Patent Publication SHO No. 62-123009 cited above, most SiO is stable and requires an excess of hydrogen for reduction by hydrogen to produce Si. From an industrial standpoint, a process that requires a few hundred liters of hydrogen to obtain 28 g of Si makes it difficult to achieve inexpensive production of Si, and hence improvement is desired in this aspect.

The second problem in U.S. Pat. No. 3,010,797 is that palladium or platinum is used for hydrogen reduction of SiO, as stated in claim 1 and throughout the specification. Use of these precious metals necessitates a more expensive reaction apparatus, while it is impossible to negate the risk of contamination, by these precious metals, of the resulting Si.

As described above, with processes for obtaining Si by reduction of SiO it is difficult to obtain high purity Si due to the inclusion of solid carbon when carbon is used as the reducing agent. Also, when a reducing gas is used as the reducing agent the reduction proceeds slowly and an excess of reducing gas is necessary. Another problem has been the required use of special costly SiO such as fine particle aggregates. Furthermore, the problem common to reduction processes is that the impurities contained in the SiO concentrate in the resulting Si, so that the resulting Si has a lower purity than the original SiO.

As another prior art finding that should be mentioned, U.S. Pat. No. 3,660,298 teaches that SiO vapor causes the disproportionation reaction: 2SiO→Si+SiO$_2$ at about 1800° C. According to the present invention there is provided, as will be explained below, a process whereby SiO$_2$ solid is produced with Si, and impurities are concentrated in the SiO$_2$ solid to increase the purity of the Si produced. However, the SiO$_2$ by-product at 1800° C. is liquid, and impurities will not concentrate in liquid SiO$_2$ so that the purity of the Si produced cannot be increased. According to the process of the present invention it is possible to reduce the boron, etc. that cannot be removed by the aforementioned solidifying purification, and this is highly useful.

Moreover, while the present invention allows higher purification even in the process of obtaining Si from SiO solid, as just explained, production of high purity Si is favored when the SiO of the previous step is of as high a purity as possible. However, production of high purity SiO is not easy, as the conventional SiO production processes are associated with the following problems, In U.S. Pat. No. 3,010,797 the high purification process is a process in which the higher vapor pressure of SiO compared to most other impurities is utilized for concentration of the SiO. However, there in fact exist impurities with a higher vapor pressure than SiO, and these impurities are impossible to remove. For example, phosphorus is an impurity that must be thoroughly removed, but phosphorus and phosphorus oxides have a vapor pressure which is the same or higher than SiO, and there is absolutely no removal effect by the method disclosed in U.S. Pat. No. 3,010,797, whereby instead of being removed the impurity concentration increases. Also, although the concentration of impurities with a lower vapor pressure than SiO is reduced, they evaporate in a portion corresponding to the vapor pressure so that it is impossible to completely eliminate them from the SiO solid. In other words, the low vapor pressure impurities are generally deposited at a higher temperature than SiO, and removal of these high temperature deposits has not been considered in the prior art.

As concerns these problems associated with high purification of SiO, the same may be said for the common SiO production techniques disclosed elsewhere besides U.S. Pat. No. 3,010,797. They are generally production processes in which silicon and silica are reacted at high temperature under reduced pressure and the resulting SiO vapor is condensed to solid; these simply utilize the high vapor pressure of SiO for high purification. These processes include the process whereby silicon and silica are heated after dry grinding to fine powder to obtain SiO, disclosed in Japanese Unexamined Patent Publication SHO No. 49-98807; the process utilizing quenching by adiabatic expansion of SiO vapor, disclosed in Japanese Unexamined Patent Publication SHO No. 59-8613; and the processes utilizing concentration in the vapor phase, disclosed in Japanese Unexamined Patent Publication SHO No. 62-27318, No. 63-103814 and No. 63-103815; in regard to high purification, however, all of these processes fail to provide an improvement in principle over the high purity SiO production in the first half of the process described in U.S. Pat. No. 3,010,797. That is, for purification they merely utilize the high vapor pressure of SiO, and impurities with higher vapor pressure such as phosphorus and phosphorus oxides are instead concentrated. Also, while some of the low vapor pressure impurities evaporate, the evaporated impurities are all included in the SiO solid.

Japanese Unexamined Patent Publication HEI No. 5-171412 describes a process whereby SiO is recovered on a recovery plate held at 1000° C. to produce a low-splash SiO vapor deposition material. While Japanese Unexamined Patent Publication HEI No. 5-171412 does not deal with the purity, there is a problem in that the impurities that are deposited at a temperature higher than the temperature of the recovery plate are also deposited with the SiO solid, such that these impurities cannot be removed. Similarly, Japanese Examined Patent Publication SHO No. 40-22050 describes a process whereby SiO vapor is condensed in a vapor deposition tube kept at 450–950° C. to facilitate stripping but, as in the case of Japanese Unexamined Patent Publication HEI No. 5-171412, the impurities that are deposited at a temperature higher than the temperature of the vapor deposition are also deposited with the SiO solid and therefore cannot be removed.

As explained above, these conventional processes have not allowed complete removal of impurities such as phosphorus and phosphorus oxides that have a high vapor pressure and are deposited at a lower temperature than SiO solid or of impurities that have a relatively low vapor pressure and are deposited at a higher temperature than SiO solid.

SUMMARY OF THE INVENTION

It is a first object of the present invention to provide a process for producing high purity Si economically and efficiently, by a process other than reduction from cheaply produced SiO solid, and a process for obtaining Si with higher purity than SiO solid, by high purification of Si in the course of producing Si from SiO solid. In particular, this allows an amount reduction of boron which has been impossible to remove by solidifying purification with common metal purification processes.

It is a second object of the invention to provide a process for achieving high purification in the course of producing SiO solid, and particularly to provide a process for removing impurities with a high vapor pressure such as phosphorus and phosphorus oxides that cannot be removed by the prior art processes, and for achieving even higher purification than the prior art even for low vapor pressure impurities by utilizing the difference in the deposition temperatures.

The invention achieves these objects by providing (1) a production process for high purity Si wherein solid silicon monoxide SiO is heated at a temperature of at least 1000° C. and below 1730° C., for a disproportionation reaction in which the solid SiO is decomposed to liquid or solid silicon Si and solid silicon dioxide SiO$_2$, and the produced Si is separated from the SiO$_2$ and/or SiO.

The following are also provided as preferred embodiments of the invention.

(2) A production process for high purity Si wherein the SiO solid is heated at a temperature of at least the melting point of Si and below 1730° C.

(3) A production process for high purity Si wherein the SiO solid is heated at a temperature of at least the melting point of Si and below 1730° C. and the produced liquid Si is separated, in liquid form, from the solid SiO and/or SiO$_2$.

(4) A production process for high purity Si wherein the solid SiO is kept heated at a temperature of at least 1000° C. and below the melting point of Si, and is then heated at a temperature of at least the melting point of Si and below 1730° C.

(5) A production process for high purity Si, wherein the reaction is carried out under conditions such that, in terms of the molar ratio of Si and SiO$_2$ produced by the disproportionation reaction represented by 1:x, x satisfies the inequality $1.5 \geq x \geq 0.5$.

(6) A production process for high purity Si, wherein the reaction system is substantially closed during the disproportionation reaction so that fresh atmosphere gas is not supplied to the reaction system, to prevent vaporization of the solid SiO.

(7) A production process for high purity Si wherein the flow rate of the atmosphere gas fed to the reaction system during the disproportionation reaction is controlled to realize said molar ratio of Si to $SiO_2$ of 1:x ($1.5 \geq x \geq 0.5$).

(8) A production process for high purity Si wherein the atmosphere gas supplied to the reaction system includes an oxidizing gas, and the flow rate of the oxidizing gas is controlled such that the molar ratio of Si to $SiO_2$ of 1:x satisfies the inequality $1.5 \geq x \geq 1.0$.

(9) A production process for high purity Si wherein the atmosphere gas supplied to the reaction system includes a reducing gas, and the flow rate of the reducing gas is controlled such that the molar ratio of Si to $SiO_2$ of 1:x satisfies the inequality $1.0 \geq x \geq 0.5$.

(10) A production process for high purity Si wherein the solid SiO is in the form of particles with a mean particle size of 1 µm–5 mm.

(11) A production process for high purity Si wherein the impurity concentration of the produced Si is no more than $\frac{1}{10}$ of the impurity concentration of the solid SiO.

(12) A production process for high purity Si wherein the impurity concentrations of phosphorus and boron in the produced Si are lower than the impurity concentrations of phosphorus and boron in the solid SiO.

(13) A production process for high purity Si wherein the Si which is obtained is subjected to further high purification by a solidifying purification process.

(14) A production process for high purity Si wherein the SiO solid is obtained by a process whereby a starting mixture of carbon C, silicon Si or ferrosilicon, or a combination thereof with $SiO_2$, is heated to generate SiO gas-containing gas, and the SiO-containing gas is cooled to produce solid SiO.

(15) A production process for high purity Si wherein during cooling of the SiO-containing gas, in a first zone of a first temperature which is at or above the deposition temperature of solid Si the solid impurities that condense and are deposited at the first temperature are first removed, solid SiO is then deposited in a second zone of a second temperature which is within the range of no higher than the deposition temperature of solid SiO and at least 300° C., and the SiO deposited in the second zone is used as the solid SiO starting material for the disproportionation reaction.

(16) A production process for high purity Si wherein the cooling of the SiO-containing gas is carried out by introducing the SiO-containing gas at the high temperature end of a reaction apparatus with a temperature gradient from high temperature to low temperature and transporting it to the low temperature end thereof.

(17) A production process for high purity Si wherein the amount of impurities in the produced solid SiO is not more than $\frac{1}{1000}$ compared to the amount of impurities other than carbon C, silicon Si or ferrosilicon, or combinations thereof, and Si and O in the $SiO_2$, in the starting mixture.

(18) A production process for high purity Si wherein the amount of phosphorus P in the carbon C, silicon Si or ferrosilicon, or combination thereof and the amount of phosphorus P in the $SiO_2$, in the starting mixture, are both 1 ppm or less.

(19) A production process for high purity Si wherein the SiO-containing gas is rapidly cooled to produce the solid SiO in particle form.

(20) A production apparatus for high purity Si which comprises a thermal reaction section that houses and heats the starting materials to generate a SiO gas-containing gas, a SiO-containing gas cooling section that cools the SiO gas-containing gas produced in the thermal reaction section to condense and deposit SiO, and a thermal decomposition section that houses and heats the SiO solid produced in the SiO gas-containing gas cooling section to disproportionately decompose it to Si and $SiO_2$.

(21) A production apparatus for high purity Si wherein the SiO gas-containing gas cooling section has a temperature gradient.

(22) A production apparatus for high purity Si wherein the SiO gas-containing gas cooling section has a SiO solid depositing region where SiO is deposited from the SiO gas-containing gas, and an impurity removing region between the thermal reaction section and the SiO solid depositing region, where the impurities that condense and deposit at a temperature above the deposition temperature of SiO are condensed and deposited from the SiO gas-containing gas and removed.

(23) A production apparatus for high purity Si wherein the SiO gas-containing gas cooling section is kept at 300° C. or above in the region where SiO is condensed and deposited, and is provided with an exhaust mechanism for exhaust of the gas remaining after the SiO solid has been deposited.

(24) A production apparatus for high purity Si wherein the SiO gas-containing gas cooling section has a mechanism that cools the SiO gas-containing gas by adiabatic expansion or has a mechanism that cools the SiO gas-containing gas by introduction of a cooling gas thereinto, by which SiO solid in powder deposits form from the SiO gas-containing gas, and also has powder recovery means that recovers said powdered SiO solid.

(25) A production apparatus for high purity Si, wherein the thermal decomposition section has an extraction outlet at the lower end of a heat treatment vessel in which the SiO solid is heated, in order to draw out the molten Si.

(26) A production apparatus for high purity Si, wherein the thermal decomposition section has a SiO solid heat treatment vessel and a plurality of heating sections with independently settable heating temperatures, and also has a transport mechanism that transports the SiO solid between the heating sections.

(27) A production apparatus for high purity Si, wherein the heat treatment vessel has a plurality of zones whose heating temperatures are independently set by the plurality of heating sections and has a mechanism that transports the SiO solid between these zones.

(28) A production apparatus for high purity Si, which has a mechanism that transports the heat treatment vessel between the plurality of heating sections.

(29) A production apparatus for high purity Si, wherein a plurality of the heat treatment vessels are used, and there is provided a mechanism that transports the SiO solid from the heat treatment vessel situated in one of the plurality of heating sections to the heat treatment vessel situated in another heating section of the plurality of heating sections.

Figure 1:
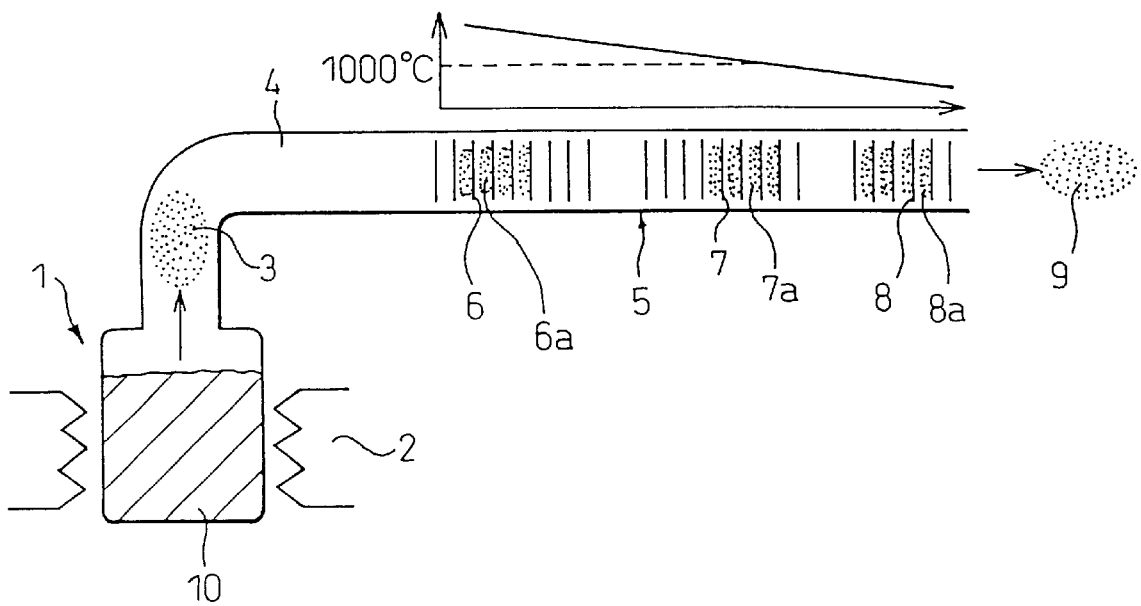
FIG. 1 is an illustration of the principle of the invention, showing a condition where low purity C and $SiO_2$ are reacted, the produced SiO-containing gas is passed through a temperature-graduated pipe, and high purity SiO solid is separated from the other impurities and deposited in a location at about 1000° C.

BEST MODE FOR CARRYING OUT THE INVENTION (Production of high purity Si from SiO solid)

Few attempts have been made to utilize SiO solid itself in chemical reactions in the prior art. However, since SiO gas consists of SiO molecules, and since the properties of this molecule are well known and any SiO solid can usually be easily gasified at high temperature without passing through a liquid phase, it has been used as a vapor deposition material.

According to the invention, however, it was found that when SiO solid is heated to high temperature as a solid without gasification, there occurs a disproportionation reaction, i.e. a reaction in which the SiO solid decomposes to Si and $SiO_2$ solid, and the produced Si can be separated. It was also found that when proportion of $SiO_2$ solid produced with respect to the Si is controlled to a certain value, the impurities in the SiO solid are concentrated in the $SiO_2$ solid so that the resulting Si is of higher purity than the SiO. This is because the impurities in the SiO are generally in the form of oxides, and oxides are more stable in $SiO_2$ solid than in Si.

As explained above under "Background Art", in processes for obtaining Si by reduction of SiO, the impurities in the SiO are concentrated in the Si product so that the obtained Si is of lower purity than the original SiO. This is the exact opposite result from the present invention. Even if SiO gas is subjected to disproportionation reaction, there is no effect of increased purity of the Si produced. As also shown by U.S. Pat. No. 3,660,298, this is because disproportionation reaction of SiO gas occurs at about 1800° C., while $SiO_2$ is liquid at about 1730° C. and above and impurities do not concentrate in liquid $SiO_2$. The crucial point is to cause disproportionation reaction of SiO solid to produce a fixed amount of $SiO_2$ solid with Si, so that the impurities concentrate in the $SiO_2$ solid to increase the purity of the Si produced. This allows a reduction in the amount of impurities, and particularly a reduction in the amount of boron and the like that have been difficult to remove from Si by solidifying purification which is commonly used for metal purification. Still, while the melting point of high purity $SiO_2$ (crystobalite) is about 1730° C., the melting point generally varies as the impurities are concentrated in the $SiO_2$. In this case, the disproportionation reaction may be carried out in a temperature range in which the $SiO_2$ is solid.

On the other hand, prior to the present invention it had not been known that disproportionation reaction of SiO solid is facilitated by heating SiO solid at high temperature under conditions suppressing gasification of SiO solid. In fact, there has been no instance of heat treating SiO solid to promote disproportionation reaction, producing Si masses of a size on the order of mm, or with a macro size of 10 mm, and separating it to actually obtain massive Si of this size by itself.

In contrast, according to the process of the present invention, it is possible to obtain Si masses with a size on the order of mm or with a macro size of 10 mm, by heating SiO solid at a temperature of at least 1000° C. and below 1730° C. In particular, it had been completely unknown to the prior art that Si grows, naturally in dissolving out and separating, at above its melting point of 1412° C., and since this knowledge allows easy separation of produced Si, it is highly useful for industry. SiO solid is used as a vapor deposition material that vaporizes at about 1250° C., and much research has been conducted on rapid vaporization of SiO solid; however, heat treatment of SiO solid at high temperature while suppressing the degree of vaporization has not been considered. It had also not been known that Si obtained by disproportionation reaction of SiO solid under specific conditions is of higher purity than the original SiO solid. In other words, when the ratio of Si and $SiO_2$ produced is at a certain proportion the Si has a higher purity than the SiO solid starting material, and this knowledge is highly useful for industry.

(Disproportionation reaction of SiO solid)

The disproportionation reaction of SiO solid referred to here is a reaction in which SiO solid as a homogeneous solid with an Si:O ratio of about 1:1 undergoes a reaction inside the solid, separating into two phases, Si and $SiO_2$. That is, it is a reaction in which the homogeneous solid becomes naturally disproportionate due to its own nature, and it is a very peculiar reaction. Most metal oxides upon heating will not naturally decompose into the metal and a high valency metal oxide. While the reason for the disproportionation reaction in SiO solid is unknown, the disproportionation reaction starts from about 1000° C. upon temperature increase. The elemental distribution in the region of about 0.1 $\mu$m can be measured by various electron spectroscopic analysis methods, and analysis of micro region of the SiO solid gives an Si:O ratio of 1:1. When the disproportionation reaction occurs, however, Si and $SiO_2$ crystal grains larger than a few $\mu$m appear and electron spectroscopic analysis reveals Si and $SiO_2$ regions in roughly equal area proportions. These crystal grains easily exceed a few dozen $\mu$m in size, and further change can be fully observed with an optical microscope. That is, the SiO solid can be seen in one homogeneous phase with an optical microscope, but when the disproportionation reaction occurs, two phases of different brightnesses corresponding to Si and $SiO_2$ can be seen. When these phases are held at high temperature for a period of time they reach a diameter of 1 mm or greater, and at above the Si melting point of 1412° C. the Si naturally dissolves out. This disproportionation reaction differs from a reduction reaction in that absolutely no reducing agent such as carbon, hydrogen, carbon monoxide or the like is required, and the Si can be produced in any atmosphere. Since $SiO_2$ is produced in an equimolar amount with Si in the disproportionation reaction, the maximum yield of Si obtained from the SiO solid does not exceed 32 wt % of the SiO solid.

(SiO solid starting material)

The SiO solid referred to throughout the present specification is composed substantially of elemental Si and elemental O with the Si atoms and O atoms in a ratio of approximately 1:1, and it is a substantially homogeneous solid in terms of composition and structure. More specifically, the elemental distribution in the range of about 0.1 μm can be measured by analysis involving electron spectroscopy, whereby the SiO solid is found to have an Si:O ratio varying from 1:1 by no more than about 2–3%, upon analysis of any micro region. In other words, the SiO solid referred to throughout this specification is a solid with an Si:O ratio of 1.00:1.03 to 1.03:1.00 for any micro region of 0.1 μm. This method of describing the SiO solid is used because SiO solid exists in a form exhibiting an amorphous pattern, in a form with a strong diffraction peak attributed to a regular crystal structure, and in other various forms, when subjected to X-ray diffraction measurement for example, and therefore the structure of SiO solid is not completely determinate. The thermodynamic data, etc. have therefore been unreliable, and this is believed to be one of the reasons for which SiO solid itself had not been utilized for chemical reactions. However, SiO gas consists of SiO molecules and its properties are well known, and since gas can easily be obtained from any SiO solid at high temperature without passing through a liquid phase, it has been used as a vapor deposition material.

The purity of SiO solid used as the starting material for the present invention is, of course, preferably has as high a purity as possible. The invention can be carried out with SiO solid of 99.9% purity or higher, but preferably with a purity of 99.99% or higher, and more preferably with a purity of 99.999% or higher. The reason that SiO solid with a purity of 99.9% or higher is preferred is that using SiO solid with a lower purity and more impurities will not allow sufficient concentration of impurities in the $SiO_2$ solid by the disproportionation reaction, or even if it occurs, the purity of the Si produced will not be sufficiently high.

(Form of SiO solid)

It is advantageous to select fine powder as the form of the SiO solid when the heat treatment temperature is higher than the melting point of Si. This is because, as mentioned above, the molten Si produced by high temperature heat treatment naturally separates from the SiO solid and the $SiO_2$ solid by-product, but the separated state is better when fine SiO solid is used, and tends to give more Si. The reason for this is the facet that molten Si hag poor wettability for SiO solid and the $SiO_2$ solid by-product, and therefore a larger surface area of the SiO solid gives a more powerful effect and a more separated state. In this case, the SiO solid is preferably in the form of particles (powder) with a mean particle size of 1 μm to 5 mm. A mean particle size of 1 μm or greater is preferred because the surface of the SiO solid is usually oxidized to $SiO_2$, and when the mean particle size is smaller than 1 μm the surface $SiO_2$ inhibits disproportionation reaction of the SiO solid, thus notably reducing the amount of Si produced. However, since SiO solid readily gasifies when the reaction vessel is a gas circulation type and the heat treatment temperature is high, the form of the SiO solid should be particles with a small specific surface area, and for example, a size of about 10 μm to 100 mm must be used to prevent gasification of the SiO solid. Thus, the form of the SiO solid may be selected within a rather wide range, and strictly speaking the overall selection should be made based on the reaction vessel, reaction temperature, reaction time, etc.

(Suppressing gasification of SiO solid)

In order to efficiently promote the disproportionation reaction of SiO solid, the heat treatment may be carried out at high temperature while keeping vaporizing gasification of the SiO solid to an absolute minimum, and for this purpose it is desirable to prevent the vaporizing gasified SiO gas from escaping from the SiO solid, and to set the pressure of the SiO gas around the SiO solid to saturation vapor pressure, thereby suppressing vaporization of SiO solid by the SiO gas at saturation vapor pressure.

Here, the heat treatment temperature according to the invention is below 1730° C., 1730° C. being the melting point of SiO such that SiO will not be liquid at below 1730°C.; this allows only the presence of SiO solid and SiO gas. The SiO solid is placed in a sealable vessel, and after evacuation with a vacuum pump, the vessel is sealed and the entire vessel is heated to 1000–1730° C. that only SiO solid and SiO gas will be present in the vessel.

When heating at 1500° C., for example, since the saturation vapor pressure of SiO is a few dozen Torr at 1500° C., the SiO solid that will be gasified is in an rid amount corresponding at most to SiO gas of a few dozen Torr, while the remaining SiO solid is not gasified. At this time, if the SiO solid is densely packed in the vessel the amount corresponding to SiO gas at a few dozen Torr can be essentially ignored compared to the SiO that is still solid, Since the density of SiO gas at above 1000° C. is only from $1/1000$ to $1/100,000$ of the density of SiO solid, the remaining volume of SiO gas can be reduced to under 1% of the SiO solid by simply loading the SiO solid to 10% of the vessel volume, while if the SiO solid is loaded to 50% of the vessel volume the remaining volume of the SiO gas can be reduced to under 0.1% of the SiO solid, and if the SiO solid is loaded to 90% of the vessel volume the remaining volume of the SiO gas can be reduced to under 0.01% of the SiO solid; the amount of SiO gas can therefore be adequately ignored.

By thus using a sealed vessel it is possible to effect heat treatment of the SiO solid as a solid with virtually no gasification, go that the disproportionation reaction of the SiO solid can be promoted. Even if other gases are present with the SiO solid, the situation described above is essentially unchanged so that the disproportionation reaction is still promoted.

(Substantially closed system)

In a process using the aforementioned closed vessel, however, the SiO gas is only present at below a few dozen Torr in the high temperature reaction vessel, but the presence of other gases will increase the pressure at high temperature. For use of such a high temperature reduced pressure vessel or pressure resistant vessel when the exterior is at or below atmospheric pressure, it is usually difficult to properly select the material of the vessel. If a gas other than SiO is introduced into the vessel with the SiO solid and the temperature is raised while gradually releasing out the gas from a pressure adjusting valve mounted on the vessel to constantly maintain approximately atmospheric pressure in the vessel, and the vessel is sealed when a given temperature is reached, the load on the high temperature vessel will be almost totally eliminated. Although the gas released during the temperature increase also naturally contains SiO gas, and the portion that has leaked out results in a lower yield, as mentioned above, merely adding the SiO solid to 10% of the vessel volume can reduce the leaking SiO gas to under 1% of the SiO solid, adding the SiO solid to 50% of the vessel volume can reduce the leaking SiO gas to under 0.1% of the SiO solid, and adding the SiO solid to 90% of the vessel volume can reduce the leaking SiO gas to under 0.01% of the SiO solid, so that the amount may be ignored. If another gas is present the gasification of the SiO solid occurs later, in an amount that can be substantially ignored with respect to the initially added SiO solid, such that it constitutes no problem.

A "closed system" according to the present invention is a system employing the aforementioned sealed vessel, or a system with means allowing release of gas during temperature increase or inflow of gas during temperature decrease in order to adjust the pressure of the sealed container, such as a pressure adjusting valve, a pinhole or the like.

(Gas flow system)

From an industrial viewpoint, pressure adjusting valves that operate at high temperatures of 1500° C., for example, are not very highly reliable, and it is common to maintain the vessel interior at atmospheric pressure while circulating the gas in the high temperature vessel. In such cases, there is no problem if the amount of circulating gas is minimal so that the amount of SiO gas released is also minimal. That is, if the SiO solid is added to 10% of the vessel volume and the total amount of gas circulated during the reaction is twice the vessel volume, the leaking SiO gas will be less than about 2% of the SiO solid, whereas if the SiO solid is added to 50% of the vessel volume and the total amount of gas circulated during the reaction is 10 times the vessel volume, the leaking SiO gas will be less than about 2% of the SiO solid. In these cases, the total amount of gas circulating during the reaction is 20 times the volume of the SiO solid. Also, if the SiO solid is added to 90% of the vessel volume and the total amount of gas circulated during the reaction is 10 times the vessel volume, the leaking SiO gas will be less than about 1.2% of the SiO solid, and there will be substantially no reduction in yield.

The various conditions will now be explained in detail.

(Temperature)

The heat treatment temperature for the reaction producing Si from SiO solid must be at least 1000° C. and may be below 1730° C., with between 1150° C. and 1650° C. being preferred, and between the Si melting point of 1412° C. and 1550° C. being most preferred.

If the heat treatment temperature is not at least 1000° C. no Si will be produced, as no Si can be produced if it is below 1000° C. To confirm this, the entire reaction product may be washed with hydrofluoric acid after completion of the heat treatment and cooling, whereby the silicon oxide solid consisting mainly of SiO solid and $SiO_2$ solid dissolves in the hydrofluoric acid while almost none of the Si dissolves. With heat treatment at below 1000° C. and washing of the entire reaction product with hydrofluoric acid, no residue, i.e. Si, remains. If the temperature is 1000° C. or above, numerous Si particles with a size of about 1 mm will remain as residue after washing with hydrofluoric acid, and these can be separated out by filtration. It can be confirmed by elemental analysis that the purity of the Si is higher than that of the SiO solid starting material, and for example, it is possible to obtain Si with a purity of 99.9999% from SiO solid with a purity of 99.999%. The reason is that the impurities are concentrated in the $SiO_2$ solid produced by the disproportionation reaction so that the Si is of higher purity. The heat treatment temperature must be no higher than 1730° C. as the melting point of SiO solid. This is expected since the disproportionation reaction of SiO solid is impossible at above the melting point of SiO solid, but another reason is that 1730° C. is also close to the melting point of $SiO_2$, and if the $SiO_2$ reaction by-product becomes liquid, the impurities in the SiO solid will not concentrate in the $SiO_2$ and thus the effect of obtaining Si with a higher purity than the SiO solid will not be achieved.

A more preferred heat treatment temperature range is from 1150° C. to 1650° C. The production rate of Si considerably increases with a heat treatment temperature of higher than about 1150° C. and, for example, when kept at that temperature for over about an hour the theoretical production of Si is about 80% or greater. If the heat treatment temperature is no higher than 1650° C., the amount of gasification of SiO is rather low, and a reduction-in-yield due to gasfication of SiO can be no more than 10% in heat treatment for one hour even when the heat treatment vessel is a gas circulation type.

The most preferred heat treatment temperature is at or above the Si melting point of 1412° C., and no higher than 1550° C. At above the melting point of Si, the theoretical amount of Si is produced even with a short heat treatment time, and the produced Si naturally separates from the SiO solid starting material and the $SiO_2$ solid by-product of the disproportionation reaction. This is attributed to the fact that molten Si has poor wettability for SiO solid and the $SiO_2$ solid by-product and the molten Si is therefore discharged from them, and aggregates to give a smaller surface area. When the entire reaction product is examined upon cooling after heat treatment, there is seen production of numerous pure Si masses that are rounded with a size of about 1 cm. Fortunately, the Si masses produced contain absolutely no SiO solid starting material or $SiO_2$ solid by-product, and the surfaces of the Si masses have a metallic luster with no substances other than Si adhering to the surfaces. Consequently, the produced Si can be easily separated by collecting these Si masses.

It is highly preferable in practical terms for the heat treatment temperature to be no higher than 1550° C., since gasification of the SiO solid is minimal and the aforementioned reduction in Si yield can be kept to under about 5% without any special considerations for the atmosphere or reaction vessel form.

When the heat treatment temperature is considered from the viewpoint of the material of the reaction vessel used for the invention, a high purity ceramic, or for reinforcement of the mechanical strength with another material, high purity quartz, or silicon carbide-coated carbon or the like, may be used at up to 1730° C. However, it is preferably no higher than 1650° C. in order to avoid contamination from the reaction vessel material, since almost no contamination occurs within this temperature range. It is more preferably no higher than 1550° C., since high purity quartz has sufficient strength as a material for reaction vessels within this temperature range, and the design of the reaction vessel may therefore be simpler.

A short holding time for heat treatment of the SiO solid at the prescribed high temperature is sufficient, and for example, about 10 minutes is adequate. However, since SiO solid has a small thermal conductivity, treatment of a large amount of SiO solid requires a holding time sufficient to bring the entire amount of SiO solid to the prescribed temperature and, for example, with approximately 1 kg a holding time of about one hour will allow more complete heat treatment. The temperature elevating rate to the prescribed heat treatment temperature is not particularly restricted, and it may be about 5–100° C./min which can be easily accomplished in a common heating furnace.

The temperature pattern for heat treatment of the SiO solid will now be explained. As mentioned above, when SiO solid is heated at above the melting point of Si, the molten Si that is produced naturally separates from the $SiO_2$ solid by-product, thus allowing easy separation of molten Si drops. Rather than abruptly raising the temperature to the preferred heat treatment temperature of above 1412° C. which is the melting point of Si, the Si yield is sometimes improved by heating for a prescribed time at a temperature below the melting point of Si and then raising the temperature to above 1412° C. For example, the Si yield is improved by about a few percent if a temperature of 1200° C. is held for about 10 minutes. While the reason for this is not clear, it is believed that holding at a high temperature below the melting point of Si may induce growth of the Si crystal grains produced by the disproportionation reaction. The heating time at the high temperature below the melting point of Si in this case must be at least 10 minutes in order to produce any significant effect.

(Relationship between atmosphere, Si/SiO$_2$ molar ratio, and purity of Si produced)

The following explanation concerns the relationship between the atmosphere for the heat treatment of the SiO solid, the molar ratio of the Si and SiO$_2$ solid finally produced by the disproportionation reaction of SiO solid, and the purity of the Si that is produced.

(Non-reactive atmosphere)

The first explanation will concern cases where no gas is supplied or an inert gas such as argon, helium or a mixture thereof is introduced or circulated through the system.

If the molar ratio of the Si and SiO$_2$ solid finally produced according to the invention is represented as 1:x, the SiO solid hag an Si:O ratio of approximately 1:1, and therefore in a condition with no supply of gas or in an inert atmosphere, only the disproportionation reaction of the SiO solid will proceed and x should be approximately 1. However, depending on the material composing the reaction vessel, the SiO solid is either oxidized or reduced so that x may shift from 1. For example, when high purity quartz is used for the reaction vessel the SiO solid is slightly oxidized, resulting in a value for x that is slightly larger than 1. In this case, since the Si yield is only lowered by the increase in x from 1, x is preferably as small and as close to 1 as possible, in which case the preferred range is about $1.2 \geq x$. When, for example, high purity silicon carbide is used for the reaction vessel the SiO solid is slightly reduced, and x is smaller than 1 as a result. In this case, if x is much smaller than 1 the impurities in the SiO solid concentrate in the SiO$_2$ solid by-product thus reducing the effect of increased purity of the Si produced, and therefore x is preferably as large and as close to 1 as possible, with the preferred range being about $x \geq 0.8$. The value of x will vary considerably depending on the heat treatment temperature, the heat treatment time and the form of the SiO solid, and the heat treatment temperature and heat treatment time must be selected according to the reaction vessel material and form of the SiO solid such that approximately $1.5 \geq x \geq 0.5$, and preferably $1.2 \geq x \geq 0.8$.

(Oxidizing atmosphere)

The following explanation will concern cases where an oxidizing atmosphere, such as air, is introduced or circulated through the system. In such cases, the SiO solid starting material and the produced Si are oxidized to SiO$_2$, thus lowering the Si yield. If the molar ratio of the Si and SiO$_2$ solid finally produced is represented as 1:x as above, in an oxidizing atmosphere the SiO solid starting material and the produced Si are oxidized so that $x \geq 1$. Even with the same oxidizing atmosphere, the degree of oxidation varies considerably depending on the heat treatment temperature, the heat treatment time, the form of the SiO solid starting material, etc., and even when an economical gas such as air is used to prevent lower Si yield and obtain high purity Si more economically, it is necessary to limit x so that approximately $1.5 \geq x$, and preferably $1.2 \geq x$. Naturally, x can be reduced by a smaller total amount of oxidizing gas residing in the reaction vessel during the heat treatment, but it is often difficult to predict the level of the x value beforehand, and in practice a preliminary reaction is conducted to select the appropriate conditions for the x value.

The advantages of an oxidizing atmosphere are that when the impurities contained in the SiO solid are in the form of simple metals, an oxidizing atmosphere facilitates concentration of the impurities into the SiO$_2$ solid by-product, so that the obtained Si may be of higher purity. This is because simple metals in an oxidizing atmosphere are oxidized to their metal oxides, which more readily concentrate in the SiO$_2$ solid by-product than the simple metals. For example, simple boron or simple aluminum in SiO solid is oxidized to boron oxide or aluminum oxide in an oxidizing atmosphere, and the oxides more readily concentrate in the SiO$_2$ solid by-product, thus lowering the concentration of boron and aluminum in the produced Si. As will be explained in greater detail below, although hi can also be purified by solidifying purification which is the common purification process for metals, the segregation coefficient of boron is close to 1 which renders its removal difficult by this process, while aluminum can only be reduced to one a few hundredth (1/a few 100s). When these simple metals are included in the SiO solid, it is highly useful to if accomplish the heat treatment in an oxidizing atmosphere for their maximum removal from the produced Si.

(Reducing atmosphere)

The following explanation will concern cases where a reducing gas is introduced or circulated through the system as the heat treatment atmosphere for the SiO solid. The reducing gas used may be hydrogen, or if the temperature is no higher than about 1600° C., it may be hydrogen monoxide or hydrogen carbide gas. At higher temperatures above about 1600° C., carbon monoxide and hydrogen carbide gas react with the SiO solid producing SiO and lowering the yield of Si, but at lower temperatures the production of SiO is substantially negligible. However, in a reducing atmosphere the SiO solid in the disproportionation reaction not only decomposes to Si and SiO$_2$ solid, but a portion of the SiO solid is reduced to Si. With such production of Si by reduction, impurities in the SiO solid concentrate in the Si, as mentioned above. Consequently, in order to obtain high purity Si it is preferable to minimize reduction reaction of the SiO solid. If the molar ratio of the Si and SiO$_2$ solid finally produced is represented as 1:x, in the case of a reducing atmosphere the SiO solid starting material is reduced thus slightly promoting the Si-producing reaction, and therefore $1 \geq x$. Even with the same reducing atmosphere, the degree of reduction varies considerably depending on the heat treatment temperature, the heat treatment time, the form of the SiO solid starting material, etc., and at least $x \geq 0.5$ must be satisfied so that the impurities will concentrate in the SiO$_2$ solid produced by the disproportionation reaction of the SiO solid, for a high purity of the produced Si. In order to achieve an adequate effect of high purification of Si by the disproportionation reaction, it is preferred for $x \geq 0.8$. Naturally, x can be brought to approach 1 by a smaller total amount of reducing gas residing in the reaction vessel during the heat treatment, but it is often difficult to predict the level of the x value beforehand, and in practice a preliminary reaction is conducted to select the appropriate conditions for the x value. SiO is difficult to reduce, as was explained above under "Background Art", and therefore only a portion of the SiO solid is reduced even with introduction of the reducing gas, such as hydrogen, in the stoichiometric amount theoretically required to reduce the entire amount of SiO solid to Si. Consequently, if only less than a stoichiometric amount of the reducing gas is introduced, x will definitely approach 1; for example, if only half of the stoichiometric amount is introduced, the condition $x \geq 0.5$ can be reliably achieved.

(Other atmospheres)

In addition to the atmospheres mentioned above, there may also be used, of course, a mixed gas of an inert gag and an oxidizing gag, or a mixed gas of an inert gas and a reducing gas, and these may be used with a fixed total volume of the oxidizing gas and the reducing gas, with adjustment of the pressure and flow rate.

It is of course preferred for the gas of the atmosphere described above to be of high purity, and in particular the gas preferably contains no metal impurities or the like, or if it contains such impurities they must be in an amount that does not reduce the purity of the produced Si to below 99.999%, for example.

The pressure of the atmosphere is not particularly restricted, but when the high temperature heat treatment vessel is a gas circulation type, the pressure is preferably raised to suppress gasification of the SiO solid and improve the Si yield. In most cases, however, a pressure of about 1 atmosphere is preferred from the standpoint of the apparatus construction.

(Method for separation of produced Si)

As explained above, the method for separation of the produced Si involves separation by natural dissolving out of the Si at above the Si melting point of 1412° C. Here, since absolutely no SiO solid starting material or $SiO_2$ solid by-product is included in the produced Si, it is possible to easily separate the produced Si by collecting the Si masses after cooling. By providing an outlet allowing the molten Si to be drawn out in liquid form at the lower end of the heat treatment vessel, it is possible to separate the molten Si as falling drops, and this method is a very easy separation method.

Other methods may be used for separation of the produced Si. When the SiO solid starting material is in powder form, the SiO solid and the $SiO_2$ solid by-product after completion of the high temperature heat treatment are in the form of very brittle powdered aggregates, and when the SiO solid starting material is in the massive form the SiO solid and the $SiO_2$ solid by-product after completion of the high temperature heat treatment are in the form of very brittle porous masses. In contrast, the produced Si masses are dense, hard masses. Gentle pulverization of the entire reaction product can therefore produce fine powder from the components other than the produced Si masses, thus allowing easy separation of the produced Si by sifting.

Another method, as explained above, is one in which upon completion of the heat treatment the entire reaction product is washed with hydrofluoric acid, for example. Since the silicon oxide solid consisting mainly of SiO solid and $SiO_2$ solid dissolves in the hydrofluoric acid while almost none of the Si dissolves, the residue remaining after washing the entire product with hydrofluoric acid can be filtered and collected to obtain Si alone.

(Purity of produced Si)

Upon elemental analysis of Si obtained by the disproportionation reaction of the invention, the resulting Si was found to be of better purity than the SiO solid starting material. This is the result of concentration of the impurities in the $SiO_2$ solid by-product, and for example, when the SiO solid contains aluminum at 1 ppm and boron at 1 ppm, the aluminum concentration in the produced Si is reduced to about 0.05 ppm and the boron concentration to about 0.1 ppm.

Utilizing this disproportionation reaction can achieve higher purity by a factor of 10 or more, and as pointed out above, it is highly useful since it allows reduction of boron whose removal by solidifying purification has been difficult.

The high purity Si obtained by the process described above can be even further purified by solidifying purification, which is a common purification process used for metals. That is, as the heated and dissolved Si cools to hardness, the Si may be further purified by a process in which the impurity elements other than Si are concentrated and condensed in the finally solidifying portion. This is based on the fact that most impurity elements have a small segregation coefficient in Si. In this solidifying purification, boron and phosphorus have a segregation coefficient of approximately 1 and their removal is difficult by this process, but aluminum with a small segregation coefficient can be reduced to one a few hundredth (one divided by a few hundreds) while the other metals with smaller segregation coefficients can be reduced to below $\frac{1}{1000}$. For use in solar batteries, Si is usually heated to melting and then cooled and solidified as an ingot, and sliced for use, and therefore if the solidification is carried out in a controlled manner so that the solidification occurs gradually and unidirectionally for effective solidifying purification, it can be easily incorporated into the ingot production process. If the amount of boron or phosphorus in the Si is sufficiently small, solidifying purification of Si with a purity of 99.9999%, for example, can give a purity of 99.99999%.

(Novel high purity SiO solid production process)

A process for obtaining Si at higher purity than SiO solid by high temperature heat treatment of the SiO solid has been described above, but it is not always easy to obtain high purity SiO solid as a starting material. In particular, considering application to solar batteries, it is not precisely known which impurities lower the efficiency of solar batteries, and most of the commonly distributed SiO solid is insufficient. According to the present invention, however, it has been discovered that it is highly effective to employ a process for obtaining high purity SiO solid which takes advantage of the high vapor pressure of SiO and the high deposition temperature from gas to solid. It is known that substances with low melting point and boiling points generally have a high vapor pressure or vaporization rate, and the melting point and boiling point correspond well to the deposition temperature from gas to liquid or solid. However, SiO has a very high vapor pressure despite its high deposition temperature. This is believed to be closely connected with the fact that SiO gasifies directly from solid to gas without passing through a liquid phase, i.e., it sublimates. By utilizing this high segregation temperature and high vapor pressure of SiO, it is possible to easily remove boron which cannot be removed by the common metal purification process of solidifying purification, and high vapor pressure phosphorus which cannot be removed simply by utilizing the high vapor pressure of SiO in the SiO production stage, and thereby to obtain high purity SiO solid.

(Details of high purity SiO solid production process)

The process for obtaining high purity SiO solid will now be explained in greater detail.

As the starting materials, $SiO_2$ and an appropriate reducing agent such as C are combined in a molar ratio of 1:1, for example, and upon reaction at 1000° C. or higher, preferably between 1250° C. and about 2000° C., gas is produced. The components of the gas are mainly SiO and CO produced by reaction of the C and $SiO_2$, accompanied naturally by production of gas of various impurity elements or impurity element oxides contained in the starting material. However, the gas of the impurity elements can be separated utilizing the difference in gasification and deposition properties compared with SiO gas. For example, boron oxide has a lower vapor pressure and vaporization rate than SiO gas, while boron has an even lower vapor pressure and vaporization rate than boron oxide, so that the amount included in the gas is lower than in the SiO gas. The vapor pressure and vaporization of iron and iron oxide are also small, and therefore only small amounts are included in the gas. In other words, since substances with a deposition temperature of about the same level as SiO generally have a lower vapor pressure and vaporization rate than SiO, their amounts in the gas produced are smaller than in the starting material, and they are therefore separated from the SiO gas in the vaporization step. Impurities such as aluminum oxide are deposited at a higher temperature than SiO, and they can therefore be deposited and separated by situating the impurity removal section, held at a higher temperature than the deposition temperature of SiO solid, between the heated region of the starting material comprising C and $SiO_2$ and the SiO solid deposition region. On the other hand, phosphorus and phosphorus oxides which have a low boiling point and a high vapor pressure become gases with SiO, and cannot be separated from the SiO gas. However, since phosphorus and phosphorus oxides remain gases without being deposited at the deposition temperature of SiO, SiO solid is deposited from the gas in the region set to the deposition temperature of SiO, which is higher than 300° C., while the remaining gas components that are not deposited at that temperature are deposited in a lower temperature section or are discharged, thus allowing their separation from the SiO solid.

If the amount of phosphorus in the original starting material is small, for example no greater than 1 ppm (weight), it is possible to obtain SiO solid containing no phosphorus without using the above-mentioned method (deposition of SiO at above 300° C.).

(Atmosphere for production of high purity SiO)

The atmosphere used for reaction of a starting material composed mainly of C and $SiO_2$ to generate SiO and CO gas may be simply under reduced pressure, for example, about $10^{-5}$ Torr to 100 Torr. However, as the starting material reaction proceeds the condition of the generated gas such as SiO varies, such that the location of the SiO solid deposition is sometimes inconsistent, and it is often better to circulate an inert gas such as argon or helium. It is also possible to use hydrogen or a mixed gas of hydrogen and an inert gas. A small amount of an oxidizing gas may also be included.

(For starting materials other than C)

Instead of reaction of mainly C and $SiO_2$ as degcribed above, the starting material used to generate the SiO gas may also be a combination of another reducing agent and $SiO_2$, and for example, a reaction of Si and $SiO_2$ may be employed, or a reaction between ferrosilicon and $SiO_2$. In these cases no CO is generated and primarily SiO alone is generated, but the conditions for generation of SiO are the same as when C and $SiO_2$ are used. It is of course desirable to generate high temperature gas containing more SiO, and therefore other starting materials may be selected.

The process for high temperature heat treatment of high purity SiO solid from the above starting materials to obtain high purity Si is the same as the process described above, and for example, from SiO solid with a purity of 99.9999% it is possible to obtain Si with a purity of 99.99999%.

As explained above, the obtained high purity Si may be further highly purified by solidifying purification, i.e., using the difference in segregation coefficients.

(Graduated cooling)

A production process for high purity SiO solid will now be explained with reference to FIG. 1.

A starting material 10 composed mainly of a reducing agent such as C and $SiO_2$ is heated with a heater 2 to a high temperature of, for example, 1500° C., and the SiO-containing gas 3 generated by the starting material reaction is fed to an SiO solid depositing section 5. A pipe 4 is used with a graduated temperature zone that gradually lowers the temperature of the SiO solid depositing section 5 from the starting material reaction temperature of 1500° C. to room temperature, as shown in the temperature distribution graph on the SiO solid deposition section 5 in the drawing, and when SiO-containing gas 3 is passed through the SiO solid deposition section having this temperature distribution, the SiO is converted to SiO solid 7a on the deposition plate of the region 7 from, for example, 950° C. to about 1000° C., although this depends on the flow rate of the gas, while the other impurities are deposited at different regions 6, 8. Since the high vapor pressure phosphorus and phosphorus oxides 8a are deposited at the region 8 at about 300° C. or below and are not deposited between 950° C. and 1000° C., the SiO solid contains no elemental phosphorus. The aluminum oxides, etc. 6a are deposited at the high temperature section 6 near 1500–1450° C., so that the SiO solid contains no elemental aluminum. The gas 9 is that which passes through the SiO solid deposition section 5. The SiO deposition temperature varies depending on the flow rate of the generated gas which is determined by such factors as the starting material heating temperature and the reaction vessel form, and also on the presence or absence of inert gases other than the generated gas; in this process, however, even when these conditions change so that the SiO deposition temperature is different for each operation, the changes act equally on the other impurities and therefore the SiO and the other impurities can be reliably removed.

A graduated temperature apparatus such as described above has excellent flexibility for use, but the temperature distribution of the SiO solid deposition section 5 does not necessarily need to be linearly graduated, since it is only necessary for the high temperature deposition section 6, the SiO solid deposition section 7 and the low temperature deposition section 8 to be at their respective prescribed temperatures. The low temperature deposition section 8 may also be omitted.

As shown in FIG. 1, therefore, when the vapor pressure difference and the segregation temperature difference from gas to solid or liquid are both used to separate the SiO and the impurities, SiO solid with sufficiently high purity can be obtained. The obtained SiO solid can be obtained at a purity of 99.9999% or greater even when the purity of the Si and $SiO_2$ starting material is, for example, 95–99%.

As regards the temperature of the location of the SiO solid deposition, when the condition of the starting material is relatively constant and the SiO gas generation rate is constant, or when circulation of a gas such as argon, helium or hydrogen prevents substantial variation in the temperature of the location of deposition, the pipe through which the SiO and other gas generated by the starting material reaction passes is gradually lowered from the starting material reaction temperature to the SiO deposition temperature, and this temperature region may be made larger thus allowing immediate exhaust substantially without the need to reach the rear end of the pipe that has thereby fallen to a low temperature. In this case, the SiO solid deposition temperature is usually not lower than about 300° C. Also, when the SiO gas generating rate differs for each operation due to different starting material conditions and the SiO solid deposition temperature therefore differs for each operation, the pipe through which the SiO and other gas generated by the starting material reaction passes may be gradually lowered by temperature graduation from the starting material reaction temperature to about 300° C., allowing exhaust from the rear of the pipe that has thereby fallen to low temperature.

By this process, as mentioned above, the SiO solid can be separated from the other deposited impurities even if the SiO solid deposition temperature differs for each operation.

(High purity Si production apparatus)

An apparatus for carrying out the high purity Si production process hitherto described will now be explained.

Figure 2:
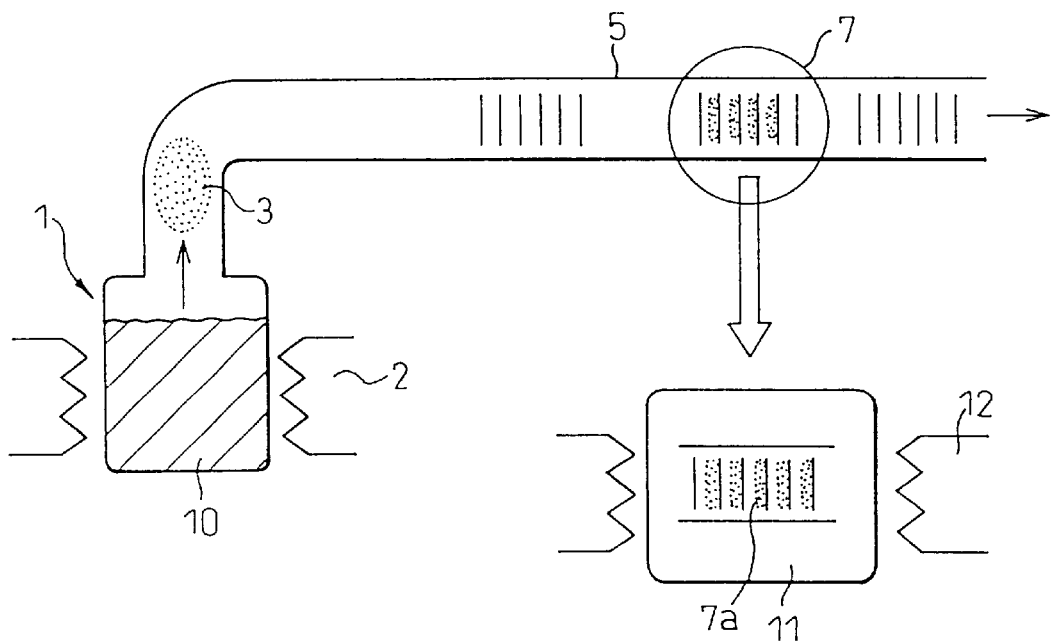
FIG. 2 is an illustration of an apparatus suitable for carrying out the invention.

FIG. 2 is an overall schematic illustration of an apparatus mainly comprising a heating reactor 1 that generates gas containing an abundant amount of SiO, an SiO-containing gas cooler 5 that deposits SiO solid from the gas as it cools, and a thermal decomposer 11 that heats the SiO solid to between 1000° C. and 1730° C. to produce high purity Si. The heating reactor in FIG. 2 comprises a heating mechanism that heats the starting material to generate SiO, and a reaction vessel, and the interior of the reaction vessel may be under reduced pressure through the SiO-containing gas cooler. The SiO-containing gas cooler has a temperature control mechanism allowing the temperature to be lowered unidirectionally from the SiO-containing gas introduction end toward the discharge end. The temperature of the region 7 where the SiO solid is deposited is preferably kept to 300° C. or higher for its discharge and removal without deposition of the low temperature deposits that generally have a high vapor pressure, and the SiO-containing gas cooler is preferably provided with a pressure reduction mechanism (not shown). The SiO solid 7a deposited from the region 7 of the SiO-containing gas cooler 5 is transported to the thermal decomposer 11 to produce high purity Si.

The SiO-containing gas is preferably cooled rapidly in the SiO-containing gas cooler, as this makes it possible to obtain the SiO solid in particle form (powder form).

Figure 3:
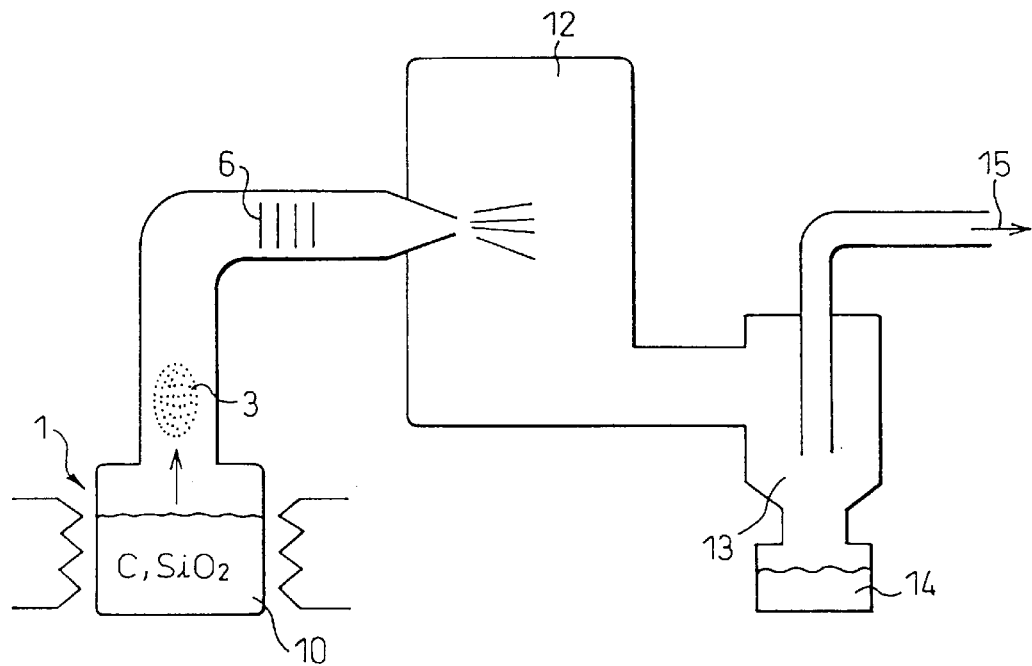
FIG. 3 is an illustration of rapid cooling of produced SiO-containing gas by adiabatic expansion and recovery of the powdered SiO solid.

FIG. 3 shows an apparatus having a construction whereby the SiO-containing gas is rapidly cooled by adiabatic expansion. In FIG. 3, the starting materials of C, $SiO_2$, etc. are heated and reacted in a heating reactor 1 and the generated SiO-containing gas 3 is removed by deposition of the high temperature-depositing impurities at a high temperature impurity deposition plate 6, after which the SiO-containing gas 3 is sprayed into an adiabatic expansion vessel 12 for adiabatic expansion whereby it is rapidly cooled at under about 1000° C., thus depositing the rapidly cooled SiO in particle form. The SiO particles deposited at the adiabatic expansion vessel 12 can be easily recovered as SiO particles 14 by a high temperature cyclone 13 or the like. A high temperature bag filter or another type of powder separating apparatus may also be used instead of the high temperature cyclone 12 to recover the SiO particles. The gas 15 remaining after deposition of the SiO is separated and removed from the SiO particles 14 by suction with a vacuum pump or the like.

Figure 4:
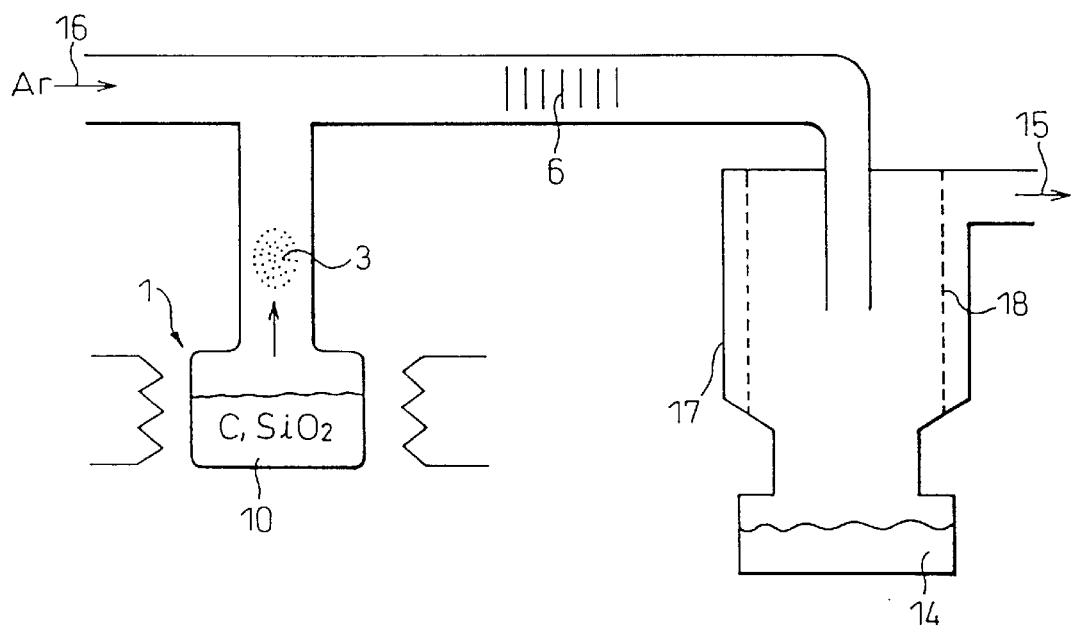
FIG. 4 is an illustration of introduction of a cooling gas into produced SiO-containing gas and recovery of the powdered SiO solid.

FIG. 4 shows an apparatus with a construction whereby cooling gas is introduced for rapid cooling, In FIG. 4, a low temperature inert gas or reducing gas or mixed gas thereof 16 is introduced into the SiO-containing gas 3 generated by the heating reaction of the starting material of C, $SiO_2$, etc. in the heating reactor 1 to accomplish cooling, thereby depositing the SiO solid 14 in powder form from the SiO-containing gag 3. The powdered SiO solid 14 produced is recovered by a powder recovery apparatus (for example, shown as a high temperature bag filter 17, where 18 is a filter), and the remaining gas 15 is exhausted out. In order to remove from the SiO-containing gas the impurities that are deposited at higher temperature than SiO, the structure shown in FIG. 4 is preferred which has a high temperature impurity deposition plate 6 kept at a higher temperature than the depositing temperature of the SiO solid, in the air generating section and the gas cooling section up to deposition of the SiO solid. An alternative to introducing cooling gas 16 before the high temperature impurity deposition plate 6 shown in FIG. 4 is to accomplish rapid cooling by introducing the cooling air 16 after depositing the high temperature-depositing impurities at the high temperature impurity deposition plate 6 (not shown).

Figure 5:
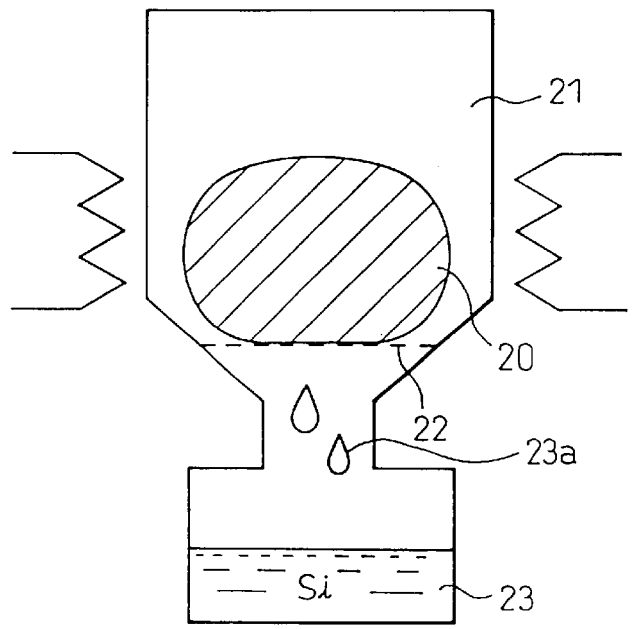
FIG. 5 is an illustration of separation and recovery of high purity Si in liquid form from SiO solid.

FIG. 5 shows an apparatus in which the Si produced upon heating of the SiO solid for production of high purity Si is separated and recovered in molten form from the SiO solid and/or $SiO_2$. The heat treatment vessel for heat treatment of the SiO solid preferably has a construction allowing heating up to the melting point of Si, since the Si produced in the heat treatment vessel will be in molten form and aggregation and growth will be mutually promoted. The material used for the heat treatment vessel may be high purity quartz, high purity ceramic, a carbon surface coated with silicon carbide, or the like. A carbon surface coated with silicon carbide may be obtained by heating carbon to about 1610° C. while contacting it with SiO gas. Providing means for drawing out the molten Si (23a), such as a mesh 22, at the lower end of the heat treatment vessel 21 heating the SiO solid 20 such as shown in FIG. 5 will allow easy separation and recovery of the produced Si (23).

Figure 6:
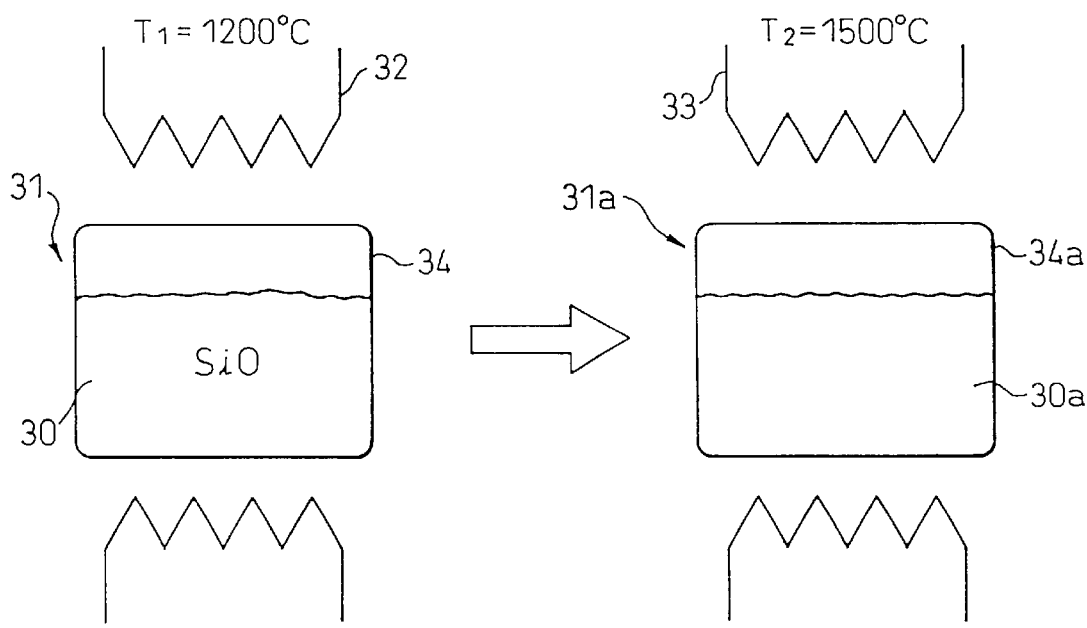
FIG. 6 is an illustration of a condition where two-stage heating of SiO solid is carried out in a plurality of heating apparatuses.

Referring to FIG. 6, a plurality of heat treatment apparatuses are preferably provided for heating of the SiO solid, with a first heat treatment apparatus 31 that heats the SiO solid 30 in the heating vessel 34 with a heater 32 to a temperature below the melting point of Si, such as 1200° C., and a second heat treatment apparatus 31a that heats the SiO solid 30a in the heating vessel 34a with a heater 33 to a temperature above the melting point of Si, such as 1500° C., and capable of transporting the SiO solid in the heating vessel 34 heated by the first heat treatment apparatus 31 to the heating vessel 34a of the second heat treatment apparatus 31a, thus allowing the temperature to be easily varied between them and consequently allowing the amount of Si product to be increased. For transport of the SiO solid heated in the first heat treatment apparatus 31 to the second heat treatment apparatus 31a, each heating vessel 34 housing the SiO solid in the first heat treatment apparatus 31 may be transported to the second heat treatment vessel 31a, instead of removing the SiO solid from the heating vessel 34 of the first heat treatment apparatus 31 and transporting it into the heating vessel 34a of the second heat treatment apparatus 31a, as explained above. Alternatively, the heating vessel 34 and the heating vessel 34a may be a single integrated vessel, with the SiO solid transported internally.

EXAMPLES

Example 1

This example is an instance of producing high purity Si by heating solid SiO in a closed reaction system.

A 20 g portion of 99.999% purity SiO solid powder with a particle size of about 0.1 mm was vacuum encapsulated at room temperature in a high purity quartz spherical vessel with an outer diameter of 40 mm and a thickness of 5 mm, and the quartz sphere was subjected to infrared heating to 1500° C. at a temperature elevating rate of 80° C./min, and then held at 1500° C. for 60 minutes.

Upon examining the reaction product remaining in the quartz sphere after cooling, a few nearly spherical masses were found each having a metallic luster and a diameter of about 5–10 mm. The spherical masses were collected and found to have a total mass of 6.3 g, while elemental analysis revealed them to be Si with a purity of 99.9999%.

The reaction residue other than the Si masses was a highly brittle porous solid, and elemental analysis revealed it to consist of approximately 99% SiO$_2$ and approximately 1% SiO solid, and in terms of impurities other than Si and O, the purity was about 99.998%.

Representing the molar ratio of the produced Si and SiO$_2$ as 1:x, x was approximately 1.005. As regards the changes in each impurity concentration, the SiO solid starting material contained aluminum at 1 ppm, boron at 1 ppm and phosphorus at 0.1 ppm, while the Si product contained aluminum at 0.05 ppm, boron at 0.1 ppm and phosphorus at 0.1 ppm. The reaction residue other than the Si masses contained aluminum at 1.45 ppm, boron at 1.42 ppm and phosphorus at 0.1 ppm.

Example 2

This example represents an instance where solid SiO was first held for at least 10 minutes at 1000° C. or higher and below the melting point of Si (1412° C.), and was then heat treated at a temperature above the melting point of Si.

Example 1 was repeated, with the only difference from Example 1 being the temperature elevating pattern: the temperature was raised to 1200° C. at a rate of 80° C./min, then held at 1200° C. for 10 minutes, then raised to 1500° C. at a rate of 80° C./min and finally held at 1500° C. for 60 minutes.

Upon examining the reaction product remaining in the quartz sphere after cooling, a few nearly spherical masses were found each having a metallic luster and a diameter of about 5–10 mm. The masses were collected and found to have a total mass of 6.35 g.

The other results including the product purity were similar to Example 1.

Example 3

This example represents an instance where solid SiO was first held for less than 10 minutes at 1000° C. or higher and below the melting point of Si (1412° C.), and was then heat treated at a temperature above the melting point of Si.

Example 1 was repeated, with the only difference from Example 1 being the temperature elevating pattern: the temperature was raised to 1200° C. at a rate of 80° C./min, then held at 1200° C. for 4 minutes, then raised to 1500° C. at a rate of 80° C./min and finally held at 1500° C. for 60 minutes.

Upon examining the reaction product remaining in the quartz sphere after cooling, a few nearly spherical masses were found each having a metallic luster and a diameter of about 5–10 mm. The masses were collected and found to have a total mass of 6.3 g, exactly as in Example 1.

The other results including the product purity were similar to Example 1.

Example 4

This example represents an instance where solid SiO was heated in a vessel with a pressure adjusting pinhole as one type of closed system.

A 20 g portion of 99.999% purity massive SiO solid with a particle size of about 0.1 mm was placed in a high purity quartz spherical vessel with an outer diameter of 40 mm and a thickness of 5 mm and having a pinhole with a diameter of 30 μm, and the weight of the entire quartz sphere was measured to be 63.0414 g. The quartz sphere was placed in an atmosphere-controllable infrared heating furnace chamber, and the entire chamber was evacuated to the 10$^{-6}$ Torr level with an oil rotary pump and a diffusion pump, after which argon with a purity of 99.9999% was introduced to 1 atmosphere. The evacuation and argon introduction operation was repeated for a total of 3 times, and the quartz sphere interior and chamber interior were brought to 1 atmosphere argon. Argon was then circulated at 1 L/min while maintaining 1 atmosphere argon in the chamber. Under these conditions, the entire quartz sphere was subjected to infrared heating to 1500° C. at a temperature elevating rate of 80° C./min, and then held at 1500° C. for 60 minutes.

After cooling, the quartz sphere was examined and found to have absolutely no expansion or other deformity, and this suggested that the expanding argon had exited through the pinhole of the quartz sphere during temperature increase and the argon had entered through the pinhole of the quartz sphere during temperature decrease, thus keeping the internal pressure of the quartz sphere at the same 1 atmosphere as the outside of the quartz sphere during heating. The weight of the entire quartz sphere after cooling was 62.7126 g, which was a weight decrease of 0.3288 g. This is attributed to leaking of SiO gas from the pinhole of the quartz sphere, resulting in a loss of about 1.6% of the SiO solid.

Upon examining the reaction product remaining in the quartz sphere after cooling, a few nearly spherical masses were found each having a metallic luster and a diameter of about 5–10 mm. The masses were collected and found to have a total mass of 6.2 g, while elemental analysis revealed Si with a purity of 99.9999%.

The reaction residue other than the Si masses was a highly brittle porous solid, and elemental analysis revealed it to consist of approximately 99% SiO$_2$ and approximately 1% SiO solid, and in terms of impurities other than Si and O, the purity was about 99.998%.

Representing the molar ratio of the produced Si and SiO$_2$ as 1:x, x was approximately 1.004. As regards the changes in each impurity concentration, the SiO solid starting material contained aluminum at 1 ppm, boron at 1 ppm and phosphorus at 0.1 ppm, while the Si product contained aluminum at 0.05 ppm, boron at 0.1 ppm and phosphorus at 0.08 ppm. The reaction residue other than the Si masses contained aluminum at 1.46 ppm, boron at 1.44 ppm and phosphorus at 0.11 ppm.

Example 5

This example represents an instance where solid SiO was heated while circulating an inert gas.

A 20 g portion of 99.999% purity massive SiO solid with a size of about 10 mm was placed in a high purity quartz tube with a diameter of 20 mm and while circulating argon with a purity of 99.9999% at 0.003 L/min and 1 atmosphere, it was subjected to infrared heating to 1500° C. at a temperature elevating rate of 80° C./min, and then held at 1500° C. for 60 minutes.

After cooling, the weight of the contents of the quartz tube was measured to be 19.5126 g, which was a weight reduction of 0.4874 g. This is attributed to discharge of SiO gas with the argon, resulting in a loss of about 2.4% of the SiO solid.

Upon examining the reaction product remaining in the quartz tube, a few nearly spherical masses were found each having a metallic luster and a diameter of about 5–10 mm. The masses were collected and found to have a total mass of 6.0 g, while elemental analysis revealed Si with a purity of 99.9999%. The reaction residue other than the Si masses was a highly brittle porous solid, and elemental analysis revealed it to consist of approximately 95% $SiO_2$ and approximately 5% SiO solid, and in terms of impurities other than Si and O, the purity was about 99.998%.

Representing the molar ratio of the produced Si and $SiO_2$ as 1:x, x was approximately 0.998. As regards the changes in each impurity concentration, the SiO solid starting material contained aluminum at 1 ppm, boron at 1 ppm and phosphorus at 0.1 ppm, while the Si product contained aluminum at 0.05 ppm, boron at 0.1 ppm and phosphorus at 0.07 ppm. The reaction residue other than the Si masses contained aluminum at 1.46 ppm, boron at 1.44 ppm and phosphorus at 0.12 ppm.

Comparative Example 1

This comparative example represents an instance where solid SiO was heated at below 1000° C.

The SiO solid was heat treated under the same conditions as Example 5 except that the holding temperature was 950° C., and the weight of the contents after cooling was measured to be still 20 g, showing no weight decrease.

The reaction product remaining in the quartz tube showed no change from before heat treatment, and washing with hydrofluoric acid dissolved the entire amount, indicating no production of Si.

Example 6

This example demonstrates that when solid SiO is heated at above 1000° C., Si is produced and the purity of the Si that is obtained is improved over the purity of the solid SiO starting material.

Example 5 was repeated, but the SiO solid was heat treated with the holding temperature at 1050° C. The weight of the contents after cooling was measured to be still 20 g, showing no weight decrease.

The reaction product remaining in the quartz tube showed no change from before heat treatment, and washing with hydrofluoric acid left a minute residue, which when filtered and collected was measured to be a total of 4.9 g and by elemental analysis was identified as Si with a purity of 99.9999%. As regards the changes in each impurity concentration, the SiO solid starting material contained aluminum at 1 ppm, boron at 1 ppm and phosphorus at 0.1 ppm, while the Si product contained aluminum at 0.05 ppm, boron at 0.1 ppm and phosphorus at 0.07 ppm.

Example 7

This example demonstrates that when solid SiO is heated at below 1730° C., Si is produced and the purity of the Si that is obtained is improved over the purity of the solid SiO starting material.

A 20 g portion of 99.999% purity massive SiO solid with a size of about 10 mm was placed in a high purity silicon carbide tube with a diameter of 20 mm and, while circulating argon with a purity of 99.9999% at 0.003 L/min and 1 atmosphere, it was heated with an induction heated carbon tube to 1700° C. at a temperature elevating rate of 80° C./min, and then held at 1700° C. for 60 minutes. After cooling, the weight of the contents of the silicon carbide tube was measured to be 19.3586 g, which was a weight reduction of 0.6414 g. This is attributed to discharge of SiO gas with the argon, resulting in a loss of about 3.2% of the SiO solid.

Upon examining the reaction product remaining in the silicon carbide tube, a few nearly spherical masses were found each having a metallic luster and a diameter of about 5–10 mm. The masses were collected and found to have a total mass of 5.8 g, while elemental analysis revealed Si with a purity of 99.9999%. The reaction residue other than the Si masses was a highly brittle porous solid, and elemental analysis revealed it to consist of approximately 93% $SiO_2$ and approximately 7% SiO solid, and in terms of impurities other than Si and O, the purity was about 99.998%.

Representing the molar ratio of the produced Si and $SiO_2$ as 1:x, x was approximately 1.01. As regards the changes in each impurity concentration, the SiO solid starting material contained aluminum at 1 ppm, boron at 1 ppm and phosphorus at 0.1 ppm, while the Si product contained aluminum at 0.05 ppm, boron at 0.1 ppm and phosphorus at 0.05 ppm. The reaction residue other than the Si masses contained aluminum at 1.65 ppm, boron at 1.63 ppm and phosphorus at 0.15 ppm.

Comparative Example 2

This comparative example demonstrates that when solid SiO is heated at above 1730° C., the amount of Si produced is small, and the purity of the Si that is obtained is not improved over the purity of the solid SiO starting material.

The SiO solid was heat treated under the same conditions as Example 7 except that the holding temperature was 1770° C., and after cooling, the weight of the contents of the silicon carbide tube was measured to be 16.0411 g, which was a weight reduction of 3.9589 g. This is attributed to discharge of SiO gas with the argon, resulting in a loss of about 19.8% of the SiO solid.

The reaction product remaining in the silicon carbide tube revealed glassy masses, and washing with hydrofluoric acid left a minute residue, which when filtered and collected was measured to be a total of 2.2 g and by elemental analysis was identified as Si with a purity of 99.999%. As regards the changes in each impurity concentration, the SiO solid starting material contained aluminum at 1 ppm, boron at 1 ppm and phosphorus at 0.1 ppm, while these impurities were detected in the same amounts in the Si product.

Example 8

This example represents an instance where solid SiO was heat treated while circulating an oxidizing gas.

A 20 g portion of 99.999% purity massive SiO solid with a size of about 10 mm was placed in a high purity quartz tube with a diameter of 20 mm and while circulating nitrogen with a purity of 99.9999% and oxygen with a purity of 99.9999% as a gas mixture in a proportion of 4:1 at 0.003 L/min and 1 atmosphere, it was subjected to infrared heating to 1500° C. at a temperature elevating rate of 80° C./min, and then held at 1500° C. for 60 minutes.

After cooling, the weight of the contents of the quartz tube was measured to be 19.8814 g, which was a weight reduction of 0.1186 g. This is attributed to discharge and loss of the SiO gas with the mixed gas despite increase in the SiO solid by partial oxidation.

Upon examining the reaction product remaining in the quartz tube, a few nearly spherical masses were found each having a metallic luster and a diameter of about 5–10 mm. The masses were collected and found to have a total mass of 5.8 g, while elemental analysis revealed Si with a purity of 99.9999%. The reaction residue other than the Si masses was a highly brittle porous solid, and elemental analysis revealed it to consist of approximately 91% $SiO_2$ and approximately 9% SiO solid, and in terms of impurities other than Si and O, the purity was about 99.998%.

Representing the molar ratio of the produced Si and $SiO_2$ as 1:x, x was approximately 1.03. As regards the changes in each impurity concentration, the SiO solid starting material contained aluminum at 1 ppm, boron at 1 ppm and phosphorus at 0.1 ppm, while the Si product contained aluminum at 0.04 ppm, boron at 0.08 ppm and phosphorus at 0.06 ppm. The reaction residue other than the Si masses contained aluminum at 1.40 ppm, boron at 1.39 ppm and phosphorus at 0.12 ppm.

Reference Example 1

This reference example represents an instance where in the molar ratio of Si and $SiO_2$, 1:x, x is larger than about 1.5.

A 20 g portion of 99.999% purity SiO powder with a mean particle size of 1 μm was placed in a high purity quartz tube with a diameter of 20 mm, and while circulating nitrogen with a purity of 99.9999% and oxygen with a purity of 99.9999% as a gas mixture in a proportion of 4:1 at 2 L/min and 1 atmosphere, it was subjected to infrared heating to 1500° C. at a temperature elevating rate of 80° C./min, and then held at 1500° C. for 60 minutes.

After cooling, the weight of the contents of the quartz tube was measured to be 21.2626 g, which was a weight increase of 1.2626 g. This is attributed to increase in the SiO solid by partial oxidation, despite discharge of a portion of the SiO gas with the mixed gas.

Upon examining the reaction product remaining in the quartz tube, about 10 nearly spherical masses were found each having a metallic luster and a diameter of about 2–10 mm. The masses were collected and found to have a total mass of 4.8 g, while elemental analysis revealed Si with a purity of 99.9999%. Elemental analysis of the reaction residue other than the Si masses revealed it to consist of approximately 99% $SiO_2$ and approximately 1% SiO solid, and in terms of impurities other than Si and O, the purity was about 99.998%.

Representing the molar ratio of the produced Si and $SiO_2$ as 1:x, x was approximately 1.58. As regards the changes in each impurity concentration, the SiO solid starting material contained aluminum at 1 ppm, boron at 1 ppm and phosphorus at 0.1 ppm, while the Si product contained aluminum at 0.03 ppm, boron at 0.06 ppm and phosphorus at 0.05 ppm. The reaction residue other than the Si masses contained aluminum at 1.21 ppm, boron at 1.20 ppm and phosphorus at 0.11 ppm.

In comparison with Example 8, Reference Example 1 demonstrates that when x is greater than 1.5 in the $Si:SiO_2$ molar ratio of 1:x, the amount of Si produced is lower.

Example 9

This example represents an instance where solid SiO was heat treated while circulating a reducing gas.

A 20 g portion of 99.999% purity massive SiO solid with a size of about 10 mm was placed in a high purity quartz tube with a diameter of 20 mm and while circulating hydrogen with a purity of 99.9999% at 0.003 L/min and 1 atmosphere, it was subjected to infrared heating to 1500° C. at a temperature elevating rate of 80° C./min, and then held at 1500° C. for 60 minutes. After cooling, the weight of the contents of the quartz tube was measured to be 19.5124 g, which was a weight reduction of 0.4876 g. This is attributed to discharge of the SiO gas with the hydrogen as well as slight reduction of the SiO solid by hydrogen, but it was essentially insignificant compared to Example 3 where argon was circulated.

Upon examining the reaction product remaining in the quartz tube, a few nearly spherical masses were found each having a metallic luster and a diameter of about 5–10 mm. The masses were collected and found to have a total mass of 5.8 g, while elemental analysis revealed Si with a purity of 99.9999%. Elemental analysis of the reaction residue other than the Si masses revealed it to consist of approximately 90% $SiO_2$ and approximately 10% SiO solid, and in terms of impurities other than Si and O, the purity was about 99.998%. Representing the molar ratio of the produced Si and $SiO_2$ as 1:x, x was approximately 0.99. As regards the changes in each Impurity concentration, the SiO solid starting material contained aluminum at 1 ppm, boron at 1 ppm and phosphorus at 0.1 ppm, while the Si product contained aluminum at 0.06 ppm, boron at 0.12 ppm and phosphorus at 0.09 ppm. The reaction residue other than the Si masses contained aluminum at 1.43 ppm, boron at 1.41 ppm and phosphorus at 0.11 ppm.

Reference Example 2

This reference example represents an instance where in the molar ratio of Si and $SiO_2$, 1:x, x is smaller than about 0.5.

A 2 g portion of 99.999% purity SiO powder with a mean particle size of 1 μm wag placed in a high purity quartz tube with a diameter of 80 mm, and while circulating hydrogen with a purity of 99.9999% at 300 L/min and 1 atmosphere, it was subjected to infrared heating to 1500° C. at a temperature elevating rate of 80° C./min, and then held at 1500° C. for 60 minutes. After cooling, the weight of the contents of the quartz tube was measured to be 1.7398 g, which was a weight decrease of 0.2602 g. This is attributed to discharge of SiO gas with the hydrogen, as well as reduction by the SiO solid.

Upon examining the reaction product remaining in the quartz tube, about 10 nearly spherical masses were found each having a metallic luster and a diameter of about 1–5 mm. The masses were collected and found to have a total mass of 0.826 g, while elemental analysis revealed Si with a purity of 99.998%. Elemental analysis of the reaction residue other than the Si masses revealed it to consist of approximately 88% $SiO_2$ and approximately 12% SiO solid, and in terms of impurities other than Si and O, the purity was about 99.999%.

Representing the molar ratio of the produced Si and $SiO_2$ as 1:x, x was approximately 0.45. As regards the changes in each impurity concentration, the SiO solid starting material contained aluminum at 1 ppm, boron at 1 ppm and phosphorus at 0.1 ppm, while the Si product contained aluminum at 1.31 ppm, boron at 1.32 ppm and phosphorus at 0.15 ppm. The reaction residue other than the Si masses contained aluminum at 1.25 ppm, boron at 1.23 ppm and phosphorus at 0.09 ppm.

In comparison with Example 9, this reference example demonstrates that when x is smaller than 0.5 in the $Si:SiO_2$ molar ratio of 1:x, a problem occurs in that the impurities concentrate in the Si product.

Example 10

This example demonstrates that when using an apparatus with a plate for high temperature impurity removal from low purity C and low purity silicon and a solid SiO recovery quartz plate kept at 950° C., it is possible to obtain solid SiO with a purity of at least 100,000 times greater than the starting material and it is highly effective for removal of phosphorus and boron.

A mixture of 20 g of 98% purity C granulated to a particle size of about 1 mm and 100 g of 97% purity silicon with a mean particle size of about 0.2 mm was placed in a quartz reaction vessel and heated to 1450° C. for 40 minutes with infrared rays under reduced pressure with an oil rotary pump. The generated gas was passed through a curved tube whereby the temperature was gradually lowered from 1450° C. to 1020° C. in order to remove the high temperature-depositing impurities, and then after blowing onto a high temperature impurity removal plate kept at 1020° C., it was blown onto a solid SiO recovery quartz plate kept at 950° C. and the roar end thereof was evacuated with the oil rotary pump through a gas cooling pipe.

After cooling, the curved tube and high temperature impurity removal plate kept at high temperature were examined and found to have deposition of about 0.1 g of impurities other than elemental Si. The solid SiO recovery quartz plate had adhesion of approximately 71 g of a reddish brown glassy solid, and elemental analysis thereof identified it as SiO solid with a purity of 99.9999% or greater. The C in the starting material included boron at about 40 ppm, phosphorus at about 50 ppm, aluminum at about 35 ppm and iron at about 70 ppm, while the silicon included boron at about 30 ppm, phosphorus at about 25 ppm, aluminum at about 150 ppm and iron at about 60 ppm; iron and phosphorus were not detected in the deposited SiO solid, but boron and aluminum were detected at 0.08 ppm and 0.1 ppm, respectively. The gas cooling pipe had deposition of about 0.05 g of impurities other than elemental Si, and phosphorus was only detected at a location from 200–100° C. in the gas cooling pipe. A total of a few grams of white residue remained in the quartz vessel.

When 20 g of the obtained SiO solid was heat treated at high temperature in the same manner as Example 1, about 6.3 g of Si with a purity of 99.99999% or greater was obtained, with no phosphorus or iron detected and with boron and aluminum detected at 0.007 ppm and 0.003 ppm, respectively.

Example 11

This example demonstrates that when using an apparatus with a graduated temperature cooling section, it is possible to obtain solid SiO with a purity of at least 100,000 times greater than the starting material from low purity carbon and low purity silicon, it is highly effective for removal of phosphorus and boron, and it is possible to obtain SiO solid in powder form by cooling.

A mixture of 20 g of 98% purity C granulated to a particle size of about 1 mm and 100 g of 97% purity silicon with a mean particle size of about 0.2 mm was placed in a quartz reaction vessel and heated to 1450° C. for 30 minutes with infrared rays while circulating high purity argon at 10 L/min. The generated gas was passed through a 150 cm-long quartz tube whereby the temperature was gradually lowered from 1450° C. to room temperature, and then exhausted out. Upon examination after cooling, the region of the quartz tube that had been heated to 1050–1000° C. was found to have deposition of about 70 g of an ochre-colored powder, and elemental analysis thereof identified it as SiO solid with a purity of 99.9999% or greater. The C in the starting material included boron at about 40 ppm, phosphorus at about 50 ppm, aluminum at about 35 ppm and iron at about 70 ppm, while the silicon included boron at about 30 ppm, phosphorus at about 25 ppm, aluminum at about 150 ppm and iron at about 60 ppm; iron and phosphorus were not detected in the deposited SiO solid, but boron and aluminum were detected at 0.07 ppm and 0.08 ppm, respectively. A total of a few grams of white residue remained in the quartz vessel. The section at higher than 1050° C. had about 0.5 g of adhesion and the section at lower than 1000° C. had a few grams of adhesion; no elemental Si was detected therein by elemental analysis, and phosphorus was detected only at the location from 250–150° C.

When 20 g of the obtained SiO solid was heat treated at high temperature in the same manner as Example 1, about 6.3 g of Si with a purity of 99.99999% or greater was obtained, with no phosphorus or iron detected and with boron and aluminum detected at 0.005 ppm and 0.002 ppm, respectively.

The examples and comparative examples explained above demonstrate, as already explained in detail as the mode for carrying out the invention, that heating SiO solid at a temperature from 1000° C. to 1730° C. improves the purity of the obtained Si by a factor of 10 or greater.

They also demonstrate that the range of $1.5 \geq x \geq 0.5$ is preferred where 1:x is defined as the molar ratio of the Si and $SiO_2$ produced. This is because when x is greater than 1.5 the purity of the obtained Si is achieved as expected but the yield tends to be smaller, and therefore x is preferably no greater than 1.5, whereas when x is smaller than 0.5 no improvement is achieved in the purity of the obtained Si, and therefore x is preferably 0.5 or greater.

Furthermore, by first producing SiO with particularly high purity as the starting material and then using it to produce Si, it is possible to obtain even higher purity Si.

Industrial Applicability

As explained above, the present invention may be employed to produce high purity Si simply and inexpensively. It provides a process allowing inexpensive production of Si with a purity of about 99.999% or higher that can be used for solar batteries. In general terms, there are extremely few instances in which constituent elemental metals are separated by simple heating of metal oxides, such as the SiO utilized for the invention, and here the obtained Si can be rendered to higher purity than the SiO solid starting material. The invention is also a very effective process against impurities such as phosphorus and boron that are difficult to remove by solidifying production utilizing segregation coefficients, and it allows removal of virtually all impurities by vapor pressure differences and temperature gradients of the deposition sections.

What is claimed is:

1. A production process for Si wherein solid silicon monoxide is heated in a reaction system at a temperature of at least 1000° C. and no higher than 1730° C., for a disproportionation reaction in which said solid SiO is decomposed to liquid or solid silicon and solid silicon dioxide, and the produced Si is separated from the $SiO_2$ and any remaining SiO, said reaction is carried out under conditions such that the molar ratio of Si and $SiO_2$ produced by said disproportionation reaction is 1:X, and $1.5 \geq X \geq 0.5$.

2. A production process for Si according to claim 1, wherein said SiO solid is heated at a temperature of at least the melting point of Si and below 1730° C.

3. A production process for Si according to claim 2, wherein the produced liquid Si is separated in liquid form from the solid $SiO_2$ and any remaining SiO.

4. A production process for Si according to claim 1, wherein said solid SiO is kept heated at a temperature of at least 1000° C. and below the melting point of Si, and is then heated at a temperature of at least the melting point of Si and below 1730° C.

5. A production process for Si according to claim 1, wherein the purity of the Si product is higher than that of the solid SiO.

6. A production process for Si according to claim 1, wherein the reaction system is substantially closed during said disproportionation reaction so that fresh atmosphere gas is not supplied to said reaction system, to prevent vaporization of said solid SiO.

7. A production process for Si according to claim 1, wherein an atmosphere gas is fed to the reaction system during said disproportionation reaction at a flow rate to realize said molar ratio of Si to $SiO_2$ of 1:X, and $1.5 \geq X \geq 0.5$.

8. A production process for Si according to claim 7, wherein said atmosphere gas supplied to the reaction system includes an oxidizing gas, and the flow rate of said oxidizing gas is controlled such that said molar ratio of Si to $SiO_2$ of 1:X satisfies the inequality $1.5 \geq X \geq 1.0$.

9. A production process for Si according to claim 7, wherein said atmosphere gas supplied to the reaction system includes a reducing gas, and the flow rate of said reducing gas is controlled such that said molar ratio of Si to $SiO_2$ of 1:X satisfies the inequality $1.0 \geq X \geq 0.5$.

10. A production process for Si according to claim 1, wherein said solid SiO is in the form of particles with a mean particle size of 1 $\mu$m–5 mm.

11. A production process for Si according to claim 1, wherein the impurity concentration of said produced Si is no more than 1/10 of the impurity concentration of said solid SiO.

12. A production process for Si according to claim 1, wherein the impurity concentrations of phosphorus and boron in said produced Si are lower than the impurity concentrations of phosphorus and boron in said solid SiO.

13. A production process for Si according to claim 1, wherein said Si which is obtained is subjected to further high purification by a solidifying purification process.

14. A production process for Si according to claim 1, wherein said SiO solid is obtained by a process whereby a starting mixture of carbon, silicon or ferrosilicon, or a combination thereof, with $SiO_2$ is heated to generate SiO-containing gas, and said SiO-containing gas is cooled to produce solid SiO.

15. A production process for Si according to claim 14, wherein during cooling of said SiO-containing gas, in a first zone of a first temperature which is at or above the deposition temperature of solid Si, solid impurities that condense and are deposited at said first temperature are first removed, solid SiO is then deposited in a second zone of a second temperature which is within the range of no higher than the deposition temperature of solid SiO and at least 300° C., and the SiO deposited in said second zone is used as said solid SiO starting material for said disproportionation reaction.

16. A production process for Si according to claim 15, wherein the cooling of said SiO-containing gas is carried out by introducing said SiO-containing gas at the high temperature end of a reaction apparatus with a temperature gradient from high temperature to low temperature and transporting it to the low temperature end thereof.

17. A production process for Si according to claim 14, wherein the amount of phosphorus in the carbon, silicon or ferrosilicon, or combination thereof, and the amount of phosphorus in the $SiO_2$, in said starting mixture, are both 1 ppm or less.

18. A production-process for Si according to claim 14, wherein said SiO-containing gas is rapidly cooled to produce said solid SiO in particle form.

* * * * *